T. J. SAYRE.
DEVICE FOR CLIPPING HATS.
APPLICATION FILED DEC. 13, 1910.
1,003,810.
Patented Sept. 19, 1911.
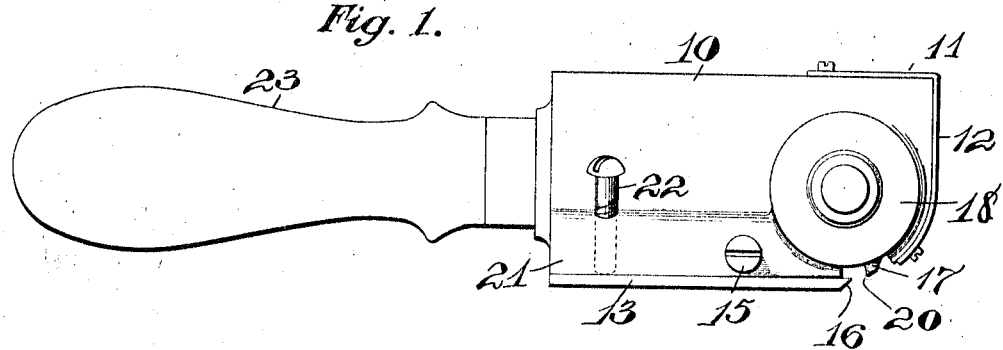
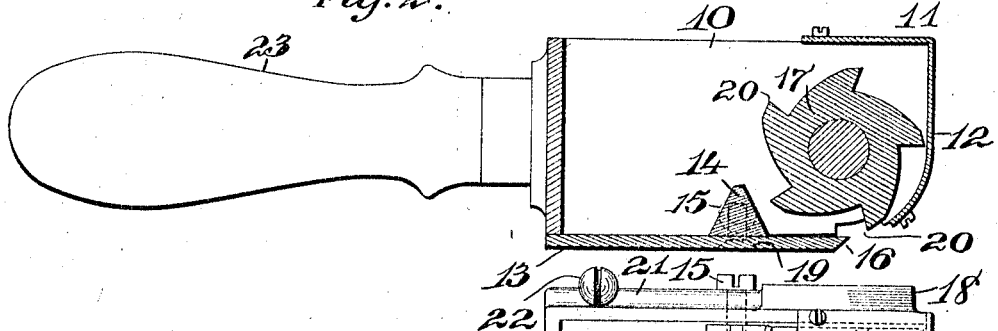
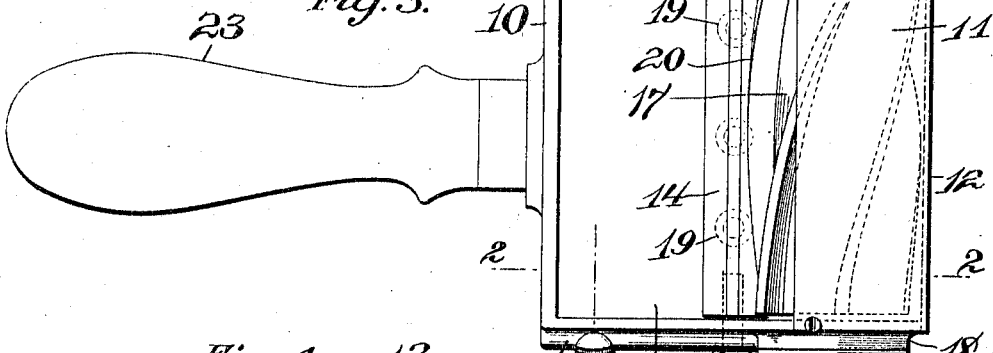
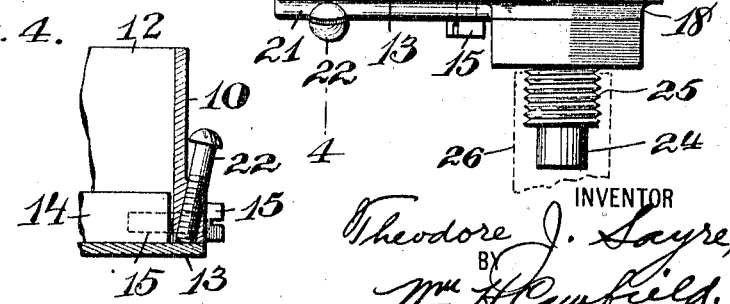
WITNESSES:
E. A. Pell
M. A. Johnson
INVENTOR
Theodore J. Sayre,
BY
Wm H Canfield
ATTORNEYS

UNITED STATES PATENT OFFICE.

THEODORE J. SAYRE, OF NEWARK, NEW JERSEY.

DEVICE FOR CLIPPING HATS.

1,003,810.  Specification of Letters Patent.  Patented Sept. 19, 1911.

Application filed December 13, 1910. Serial No. 597,033.

*To all whom it may concern:*

Be it known that I, THEODORE J. SAYRE, a citizen of the United States, residing at Newark, in the county of Essex and State of New Jersey, have invented certain new and useful Improvements in Devices for Clipping Hats; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a clipper which is portable and can be used for clipping the nap or the brush part of hat bodies, and while it is particularly designed for hat bodies, it can also be used for clipping other things, as will be evident.

It has been the custom in clipping brushed hats, or hats with a long nap, to clip them in a fixed machine, and the difficulty has been to get into the crown of the hat body because when the hat body is laid out flat it takes on a triangular shape, and when it is put over a conical form it also presents difficulties when the workman attempts to get the small pointed part, or what would be the center of the crown, in position to be clipped. To overcome this I have devised this cutter which is adapted to be adjusted to a flexible shaft, and which has a handle on it, and which can be passed over a hat body and the hat clipped to make a smooth, even surface and still provide a long enough nap or brush part. The clipper also provides means for adjusting the cutter portion of the clipper so that it can be regulated as to the length of nap that is to be clipped.

The invention is illustrated in the accompanying drawing, in which—

Figure 1 is a side view of the improved clipper. Fig. 2 is a section on line 2, 2, in Fig. 3. Fig. 3 is a top view, and Fig. 4 is a section of a part of the cutter through line 4 in Fig. 3.

The clipper comprises a frame 10 which is open at the top, except for its front part which is covered by means of a shield 11 which extends down as at 12 over the front of the frame and terminates near the bottom so as to prevent the operator being accidentally cut by the rotary cutter to be hereinafter described. The front of the frame near the bottom merges in a curve into the bottom so that the clipper can be easily worked and slid at the different angles desired over the face of the work. A bottom plate 13 is provided with a bar 14, which bar, when it receives the screws 15, acts to hold the bottom plate in swinging relation with the frame so that its front edge 16, which is formed into a cutting edge, can be swung toward or from a rotary cutter 17 which is arranged in bearings 18 at the sides of the frame. The bottom plate 13 is fastened to the bar 14 by screws 19 which are countersunk, and the bottom plate thus forms a smooth surface which can be slid freely without cutting too far into the nap or the brush part of a hat body or similar fabric or goods. It will be seen that the frame is thus provided with an opening from the edge of the shield 12 to the cutting edge of the bottom plate, and through this opening the nap or fur to be cut passes.

The rotary cutter 17 coöperates with the front cutting edge of the bottom plate, and the rotary cutter has its cutting edges 20 arranged spirally or with a pitch so that a shearing action is caused between the edge of the bottom plate and the rotary cutter to sharply cut the hair without pulling on it to pull up the fabric, and the result in clipping provides an evenly cut nap when the operation of clipping the hat body is complete. The sides of the frame 10 are widened as at 21 near the bottom, and adjusting screws 22 are arranged in the sides of the frame and are adapted to regulate the bottom plate by being forced against it as shown in Fig. 4. It will thus be seen that the bottom plate can be adjusted toward the rotary cutter, at its cutting edge, by forcing down the screws 22 on the back end of the bottom plate. The block 14, while it acts as a means for fastening the bottom plate in swinging relation to the frame, also serves to prevent the clippings from going back against the cutting edge of the bottom plate so that when the rotary cutter is operated at a high speed it throws the cut ends of the fur or hair out through the open top of the cutter, but what material does not go out is prevented from riding forward and interfering with the cutting edge, or clogging up the space adjacent to the cutting edge, by reason of its being restrained by the bar 14, as will be evident.

A handle 23 is provided and is shown fastened to the back of the frame, as it is thought this is the handiest and most convenient position for it, but it will be understood that it can be attached to any part of the frame as is desired.

I have found that this clipper can be quickly run over a hat body and, by reason of its being manually handled, it can be passed at will over particular parts of the body if they require extra clipping, and it has been found much more satisfactory and has greater utility than the previous style of cutters.

A shaft 24 is connected to the cutter and projects out from one side of the frame and is provided with means, such as a screw-thread 25, to provide for the attachment of the flexible shaft 26 thereto.

It will be understood that to provide for the swinging of the bottom plate the bottom edges of the sides of the frame are inclined slightly to one or both sides of the pivotal screws 15.

Having thus described my invention, what I claim is:—

1. A portable clipper comprising an open-topped box-like frame, a flat bottom plate on the frame extending to the back of the frame and having its front edge provided with a cutting edge, said bottom plate forming the bottom for the box, a cutter arranged to rotate in the front end of the frame and coöperate with the cutting edge of the bottom plate, a projection on the cutter extending through one side of the frame and providing for its attachment to a flexible shaft, and means for adjusting the bottom plate to move its cutting edge toward or from the rotary cutter.

2. A portable clipper comprising an open-topped box-like frame having its front wall merging into the bottom wall and a curve, an opening in the curved portion of the frame, a bottom plate having its cutting edge arranged to form one edge of the opening, said bottom plate extending from the back of the frame to near the front thereof to form a bottom for the frame, means for tiltingly arranging the bottom plate in the frame, a rotary cutter arranged in the front end of the frame and adapted to coöperate with the cutting edge of the bottom plate, and means for adjusting the bottom plate in different tilted positions to adjust its cutting edge toward or from the rotary cutter, and a handle on the back of the frame.

3. A portable clipper consisting of an open-topped frame, a rotary cutter arranged in the front of the frame, a shield arranged on the front and a front part of the top of the frame, a bottom plate, a bar on the bottom plate, screws passing through the sides of the frame and into the bar of the bottom plate to hold the bottom plate in tilting relation to the frame, and adjusting screws arranged on the frame and bearing on the back end of the bottom plate to force the cutting edge of the bottom plate toward the rotary cutter, and a handle on the back of the frame.

4. A portable clipper consisting of a frame open at the top and at the bottom, a rotary cutter mounted in the front end of the frame, a flat bottom plate forming with the frame a box-like structure, a bar secured to the bottom plate, said bar being secured to the frame to maintain said bottom plate in tilting relation to the frame, the front end of the bottom plate terminating short of the front end of the frame and being formed into a cutting edge to coöperate with the rotary cutter, and co-acting means on the bottom plate and the frame for holding the bottom plate in its different tilted positions.

5. A portable clipper consisting of a frame having an open top and bottom, a bottom plate suspended on the frame to form a bottom for the frame and extending from the back of the frame to near the front thereof and forming with the frame a box-like structure, means for suspending said bottom plate on the frame so that it can be tilted, the front end of the bottom plate being formed into a cutting edge, a rotary cutter mounted in the front end of the frame whereby a major portion of the frame can be used as a receptacle, coacting means on the bottom plate and the frame for holding the bottom plate in its different tilted positions, and means on the cutter projecting through the frame to provide for the operation of the cutter.

In testimony, that I claim the foregoing, I have hereunto set my hand this 10th day of December 1910.

THEODORE J. SAYRE.

Witnesses:
 WM. H. CAMFIELD,
 E. A. PELL.